United States Patent
Hargis et al.

[11] Patent Number: 6,101,201
[45] Date of Patent: *Aug. 8, 2000

[54] SOLID STATE LASER WITH LONGITUDINAL COOLING

[75] Inventors: David E. Hargis, San Diego; Sven E. Nelte, Carlsbad, both of Calif.

[73] Assignee: Melles Griot, Inc., Carlsbad, Calif.

[ * ] Notice: This patent is subject to a terminal disclaimer.

[21] Appl. No.: 09/130,378

[22] Filed: Aug. 6, 1998

Related U.S. Application Data

[63] Continuation of application No. 08/784,051, Jan. 17, 1997, which is a continuation-in-part of application No. 08/731,823, Oct. 21, 1996.

[51] Int. Cl.⁷ ......................................................... H01S 3/04
[52] U.S. Cl. .................. 372/36; 372/22; 372/34; 372/92; 372/98; 372/99; 372/107; 372/108
[58] Field of Search ................. 372/22, 92, 36, 372/98, 34, 99, 107, 108

[56] References Cited

U.S. PATENT DOCUMENTS

| | | | |
|---|---|---|---|
| 4,731,787 | 3/1988 | Fan et al. | 372/22 |
| 4,739,507 | 4/1988 | Byer et al. | 372/22 |
| 4,791,631 | 12/1988 | Baumert et al. | 372/22 |

(List continued on next page.)

FOREIGN PATENT DOCUMENTS

| | | |
|---|---|---|
| 0455383 | 11/1991 | European Pat. Off. . |
| 4283977 | 10/1992 | Japan . |
| 4291976 | 10/1992 | Japan . |

OTHER PUBLICATIONS

Byer, R. (1988) Diode laser–pumped solid–state lasers. Science 239:742–747.

Dorozhkin, L., et al. (1981) Optical second–harmonic generation in a new nonlinear active medium . . . Sov. Tech. Phys. Lett. 7:555–556.

(List continued on next page.)

*Primary Examiner*—Leon Scott, Jr.
*Attorney, Agent, or Firm*—Law Offices of James D. McFarland

[57] ABSTRACT

An optically-pumped laser comprises a laser cavity, a solid-state gain medium and an optically transparent heat sink (OTH) situated within the laser cavity. The gain medium and OTH are thermally coupled and at least one of the solid-state gain medium and the OTH has an etalon structure thereby improving laser efficiency. The OTH advantageously provides effective heat transfer and permits higher average power operation, particularly for thin solid-state laser materials. A metallic heat sink may be thermally coupled to the OTH to improve heat transfer. In some embodiments, the laser is end-pumped with optical pump radiation through the OTH. A second intracavity OTH may be thermally coupled to the gain medium opposite the first OTH to provide longitudinal heat transfer in both directions. A frequency-converted laser may be provided by using a nonlinear material longitudinally cooled on each end by intracavity OTHs, at least one of which comprises an etalon structure. In some frequency-converted laser embodiments, first and second converted beams are output from the laser cavity along separate optical paths in a manner that advantageously prevents intracavity interference between the two converted beams.

67 Claims, 6 Drawing Sheets

U.S. PATENT DOCUMENTS

| | | | |
|---|---|---|---|
| 4,797,893 | 1/1989 | Dixon | 372/66 |
| 4,809,291 | 2/1989 | Byer et al. | 372/75 |
| 4,847,851 | 7/1989 | Dixon | 372/75 |
| 4,860,304 | 8/1989 | Mooradian | 372/92 |
| 4,872,177 | 10/1989 | Baer et al. | 372/75 |
| 4,879,722 | 11/1989 | Dixon et al. | 372/21 |
| 4,879,723 | 11/1989 | Dixon et al. | 372/21 |
| 4,933,947 | 6/1990 | Anthon et al. | 372/34 |
| 4,942,582 | 7/1990 | Kintz et al. | 372/18 |
| 4,953,166 | 8/1990 | Mooradian | 372/21 |
| 4,982,405 | 1/1991 | Zayhowski et al. | 372/10 |
| 5,022,745 | 6/1991 | Zayhowski et al. | 350/608 |
| 5,063,566 | 11/1991 | Dixon | 372/22 |
| 5,070,505 | 12/1991 | Dixon | 372/22 |
| 5,115,445 | 5/1992 | Mooradian | 372/75 |
| 5,164,947 | 11/1992 | Lukas et al. | 372/22 |
| 5,222,088 | 6/1993 | Amano | 372/22 |
| 5,287,381 | 2/1994 | Hyuga et al. | 372/75 |
| 5,331,650 | 7/1994 | Maeda et al. | 372/26 |
| 5,441,803 | 8/1995 | Meissner | 428/220 |
| 5,511,085 | 4/1996 | Marshall | 372/22 |
| 5,757,839 | 5/1998 | Biswal et al. | |
| 5,761,227 | 6/1998 | Hargis et al. | 372/22 |
| 5,796,766 | 8/1998 | Hargis et al. | 372/36 |

OTHER PUBLICATIONS

Dimitriev, V., et al. (1979) Simultaneous emission at the fundamental frequency and the second harmonic . . . Sov Tech. Phys. Lett., 5(11):590.

Fan, T., et al. (1986) Nd:MgO:LiNbO$_3$ spectroscopy and laser devices. J. Opt. Soc. Am. 3(1):140–147.

Jensen, T., et al. (1994) Spectroscopic characterization and laser performance of . . . Appl. Phys. B. 58:373–379.

Lin, J.T. (1989) Progress Report: Diode pumping and frequency conversion. Lasers & Optronics 61–66.

Zagumennyl, A., et al. (1992) The ND:GdVO$_4$ crystal: a new material for diode–pumped lasers. Sov. J. Quantum Electron 22(12):1071–1072.

Zayhowski, J. (1990) Microchip lasers. The Lincoln Laboratory Journal 3(3):427–445.

Patent Abstract No. A 4291976. Abstract date Mar. 3, 1993 vol. 17 No. 104.

Lin, J.T. (1990) Doubled jeopardy: the blue–green race's new players. Lasers & Optronics 34–40.

Lu, B., et al. (1986) Excited emission and self–frequency–doubling effect of . . . Chinese Phys. Lett. 3(9):413–416.

Nabors, C., et al. (1992) High–power, continuous–wave, Nd:YAG microchip laser array. Optics Letters 17(22):1587–1589.

Payne, S., et al. (1992) 752 nm wing–pumped Cr:LiSAF laser. IEEE Journal of Quantum Electronics 28(4):1188–1196.

Risk, W., et al. (1989) Diode laser pumped blue light source at 473nm using intracavity frequency doubling of a 946 nm Nd:YAG laser. Appl. Phys. Lett. 54(17):1625–1627.

Sasaki, T., et al. (1991) Single–longitudinal mode operation and second–harmonic generation of Nd:YVO$_4$ microchip lasers. Optics Letters 16(21):1665–1667 (1991).

Schutz, L., et al. (May 23, 1990) Self–frequency doubling Nd:YAB laser pumped by a diode laser. CLEO–90, paper CWC4.

Tatsuno, K., et al. (May 1992) Highly efficient and stable green Microlaser consisting of Nd:YVO$_4$ with interactivity KTP for optical storage. CLEO 92, Paper CW08.

Wang, S., et al. (1990) Characteristics of neodymium yttrium aluminum borate as a diode–pumped laser material Topical Mtng. on Advance Lasers, Session TuB4 pp. 23–25.

Yaney, P., et al. (1976) Spectroscopic studies and analysis of the laser states of Nd$^3$ in YVO$_4$. J. Opt.Soc. Am. 66(12):1405–1414.

Nabors, et al. (1992) "High–power, continuous wave, Nd:YAG microchip laser array", vol. 17, No. 22, pp. 1507–1509 2412 Optics Letters.

SOLID STATE LASER WITH LONGITUDINAL COOLING

CROSS-REFERENCE TO RELATED APPLICATIONS

This application is a continuation of application Ser. No. 08/784,051, filed Jan. 17, 1997, which is a continuation-in-part of application Ser. No. 08/731,823, filed on Oct. 21, 1996.

BACKGROUND OF THE INVENTION

1. Field of the Invention

The present invention relates to lasers, and particularly to frequency-converted solid-state lasers and cooling systems for such lasers.

2. Description of Related Art

A typical solid-state laser includes a laser cavity formed by two opposing mirrors, a solid state gain medium situated within the laser cavity, and an optical pump source for pumping the gain medium. One important type of solid-state laser is a diode-pumped solid-state laser, which typically includes a rare earth doped solid-state gain medium pumped by optical radiation from a laser diode. A variety of important applications have motivated research into diode-pumped solid-state lasers, including laser display systems, optical data storage, medical instrumentation, and communications. For small to moderate levels of optical power, one particularly useful diode-pumped solid-state laser is a microlaser, which comprises a short element (i.e. less than about five mm) of a solid-state gain medium positioned in an optically resonant laser cavity. The pump beam is supplied by a semiconductor diode laser, which pumps the solid-state gain medium to provide energy to support laser operation within the laser cavity. The optically resonant laser cavity is defined by two opposing reflective surfaces, which may be formed directly on opposing ends of the solid-state gain medium. The resulting structure is compact and reliable.

Relative to other lasers, optically-pumped solid-state lasers can have many advantages including greater efficiency, smaller size, and lower cost. However, it would be advantageous to improve the efficiency of solid state lasers even further in order to reduce energy consumption, reduce waste heat, and ensure a consistent, reliable output. Efficiency improvements could provide a higher power laser at a lower cost, with obvious commercial advantages.

Many problems stand in the way of achieving higher efficiency; for example, a high temperature within any of the optical elements can adversely affect performance, and if the temperature gets too high, the laser may lose its ability to lase, and destruction of the optical element may result. Additionally, heating can optically distort the laser emission due to thermal and stress-induced birefringence. Temperature is an inherent problem in high power optically pumped lasers, because heat is unavoidably produced within the gain medium during absorption of optical pumping radiation. Also, to a much lesser extent, heat is produced by absorption of lasant radiation. Therefore, high power lasers generally produce more waste heat, which must be dissipated by a heat removal system. Problems associated with high temperature, and previous cooling systems are discussed for example, in Ser. No. 08/784,051, filed Jan. 17, 1997, now U.S. Pat. No. 5,796,766, which is hereby incorporated by reference herein.

Many solid state lasers include a nonlinear crystal that converts a fundamental laser emission to a second frequency. Such frequency-converted lasers are important because they allow access to wavelengths that would otherwise be unavailable; for example the 1064 nm near-infrared line of Nd:YAG can be frequency-doubled to the green at 532 nm. In many frequency-converted lasers, it is useful to maintain the nonlinear crystal within a predetermined temperature range, in order to optimize the efficiency of frequency conversion.

One problem with frequency-converted lasers can be caused by thermal gradients within the nonlinear crystal. Such thermal gradients can reduce efficiency in the frequency-converted output. Background information regarding the frequency conversion process is discussed, for example, in Ser. No. 08/760,702, filed Dec. 5, 1996 entitled "Efficient Frequency Converted Laser" by Hargis and Nelte, now U.S. Pat. No. 5,761,227 issued Jun. 2, 1998, which is hereby incorporated by reference herein.

SUMMARY OF THE INVENTION

In accordance with the objectives of this invention as described above and to overcome the limitations of the prior art, an apparatus and method is described that provides more effective and efficient laser operation, particularly at high powers.

An optically-pumped laser is described that comprises a laser cavity including a first mirror and a second mirror, a solid-state gain medium situated within the laser cavity, and an optically transparent heat sink (OTH) thermally coupled to the gain medium. At least one of the solid-state gain medium and the OTH has an etalon structure thereby improving laser efficiency. In one embodiment, the source of optical pump radiation comprises a laser diode or an array of laser diodes, and the laser comprises means for end-pumping the solid state gain medium through the OTH.

The OTH, which has an equal or higher thermal conductivity than the gain medium, advantageously provides effective heat transfer and permits higher average power operation. In some embodiments, a second intracavity OTH is thermally coupled to the gain medium opposite the first OTH, thereby providing longitudinal heat transfer in both directions along the optical axis of the laser cavity. The second OTH may comprise an etalon structure. Also, a heat sink may be connected to one or both of the OTHs to improve heat transfer. The longitudinal cooling system is particularly useful for thin solid-state laser materials having a thickness along the propagation axis of less than 5.0 mm, in which side cooling will have only limited effectiveness. Another advantage is that the OTH, rather than the gain medium or nonlinear crystal, can be coated with the necessary thin film dielectric coatings.

In some embodiments, a frequency-converted laser is provided by situating a nonlinear material within the laser cavity. The nonlinear material may be longitudinally cooled on each end by intracavity OTHs, which advantageously reduces thermal gradients within the nonlinear material. An etalon structure is defined by at least one of the OTHs and/or the nonlinear material. The nonlinear material provides a first converted beam propagating in a first direction along the optical axis of the laser cavity (sometimes called the "laser axis") and a second converted beam propagating in a second, opposite direction along the laser axis. In some embodiments of the frequency-converted laser, the first and second converted beams are output from the laser cavity along separate optical paths in a manner that advantageously prevents intracavity interference between the two converted beams.

The foregoing, together with other objects, features and advantages of this invention, will become more apparent when referring to the following specification, claims and the accompanying drawings.

BRIEF DESCRIPTION OF THE DRAWINGS

For a more complete understanding of this invention, reference is now made to the following detailed description of the embodiments as illustrated in the accompanying drawing, wherein.

DETAILED DESCRIPTION OF THE PREFERRED EMBODIMENT

Figure 1:
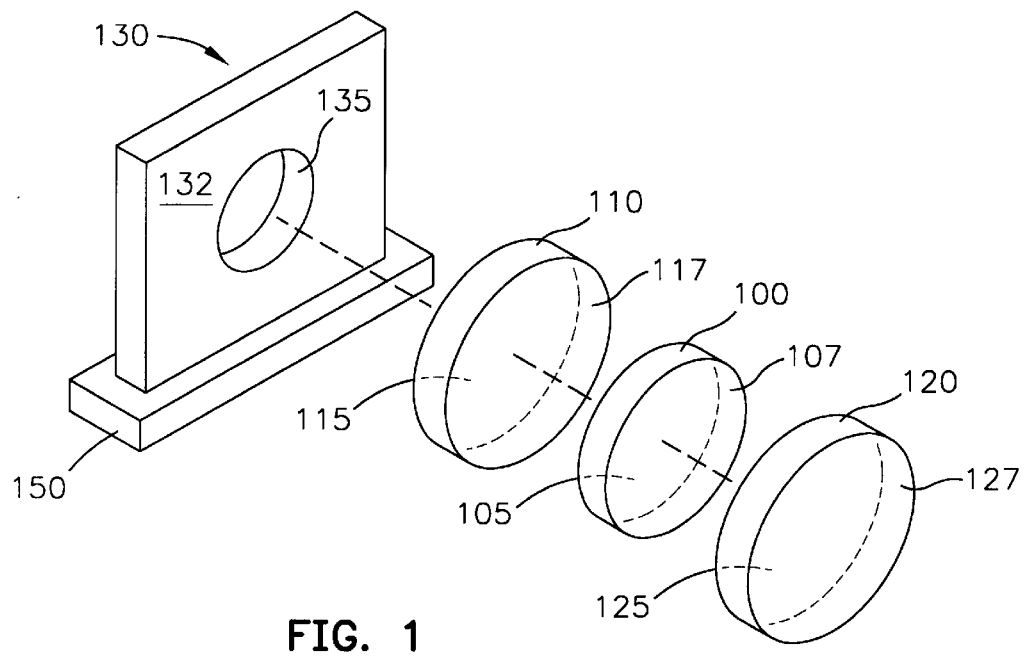
FIG. 1 is a perspective view of a double-sided longitudinally-cooled laser assembly exploded into components including a laser element, an optically transparent heat sink ("OTH") on each side of the laser element, a metallic heat sink, and a heat exchanger such as a thermoelectric cooler ("TEC") connected to the metallic heat sink.

This invention is described in a preferred embodiment in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

The terms "wavelength" ("$\lambda$") and "frequency" or ("$f$") are used herein to characterize laser radiation in one way. Wavelength is defined herein as the wavelength in free space, and therefore either term (i.e., either wavelength or frequency) uniquely characterizes the laser radiation due to the well-known relationship $\lambda.f=c$, where c equals the speed of light in the medium (herein assumed to be free space).

Although frequency conversion processes can be broadly defined to include any type of conversion from one wavelength to another, considerable attention has been directed to harmonic conversion, and specifically second harmonic generation (hereinafter referred to as "SHG"). In a SHG process, a fundamental laser frequency is doubled so that the converted frequency is twice that of the fundamental. In terms of wavelength, frequency doubling means that the converted wavelength is one-half the fundamental wavelength.

An etalon is an optical element having two opposing surfaces that define an optical cavity. Etalon structures may be defined by flat-flat surfaces, curved-flat surfaces, curved-curved surfaces, or any other surfaces that defines an optical cavity. A flat-flat etalon is defined by a pair of opposing, highly parallel flat surfaces; for example the surfaces may be parallel to less than ten arc-seconds and in some embodiments less than five arc-seconds, and have a surface roughness less than fifteen Å rms and in some embodiments less than five Å rms. Curved-flat etalons are defined by a flat surface and a curved surface whose tangent line is perpendicular to the flat surface. For example, a radii of curvature between about 1.0 cm and 100.0 cm on one surface of an etalon promotes laser stability while still providing an etalon structure that reduces losses. As will be described, in some embodiments an etalon structure is formed by a laser element, such as a gain medium or a nonlinear crystal, in other embodiments an etalon structure is formed by an optically transparent heat sink ("OTH"), and in still other embodiments both the laser element and the OTH will have an etalon structure.

In some embodiments, it may be useful to "balance" the etalon. A balanced etalon is an etalon in which the reflectivities at the two opposing parallel surfaces of the etalon are approximately equal. A balanced etalon is particularly useful if the etalon's surfaces are not parallel with an end mirror of the cavity. A balanced etalon will, in general, have greater transmission than an unbalanced etalon for light emission that is resonant with the etalon in accordance with the following equation:

$$\lambda_m = \frac{2l_e}{m} \qquad \text{Eq. 1}$$

where $\lambda_m$ is the resonant wavelength, $l_e$ is the optical thickness of the etalon, and m is an integer.

The following Eq. 2 approximates the effective reflectivity ($R_{eff}$) of the etalon at normal incidence at each $\lambda_m$:

$$R_{eff} = \left[ \frac{\sqrt{R_1} - \sqrt{R_2}}{1 - \sqrt{R_1 R_2}} \right]^2 \qquad \text{Eq. 2}$$

where, as a fractional percentage of incident power:

$R_{eff}$ is the overall reflectivity from the etalon;

$R_1$ is the reflectivity of the first surface of the etalon; and $R_2$ is the reflectivity of the second surface of the etalon.

From Eq. 2 it can be seen that, as the difference between the reflectivities at the surfaces $R_1$ and $R_2$ becomes smaller and smaller, the effective reflectivities $R_{eff}$ also becomes smaller and smaller until $R_1$ and $R_2$ are equal, at which point the effective reflectivity $R_{eff}$ becomes zero and (theoretically) all light at the resonant wavelengths will be transmitted through the etalon. Herein, one or more etalon structures are created in order to provide greater transmission (i.e. less loss) at an interface between two different materials within a laser cavity. As another advantage, the etalon structure can assist in selecting the desired lasing mode. In some embodiments, loss is further reduced by balancing the etalon so that the reflectivity at the interface between the OTH and the laser element is balanced by an approximately equal reflectivity on the side of the etalon opposite the interface. Because the reflectivities on both sides of the etalon are approximately equal, losses are substantially reduced. In some embodiments the reflectivity necessary to balance the etalon is created by a reflective dielectric coating on the opposite side and in other embodiments such reflectivity is created by connecting a material having a substantially equal index of refraction, such as a second OTH, to the opposite side. In still other embodiments the materials on either side of the etalon may have different indexes of refraction, and the etalon can be balanced by providing a coating at one or both of the interfaces with a reflectivity that compensates for the different indexes. In other embodiments, the Fresnel loss may be low enough that the etalon may be left unbalanced, and in these embodiments the second flat surface may be coated for anti-reflection.

Reference is now made to FIG. 1, which is an exploded, perspective view of a longitudinally-cooled laser assembly including a laser element 100 situated between a first OTH 110 and a second OTH 120. The laser element 100 may, for example, comprise a solid-state gain medium or a non-linear crystal. Examples of solid-state gain media include rare-earth doped materials including $Nd^{3+}$, $Er^{3+}$, $Yb^{3+}$, $Tm^{3+}$, or $Ho^{3+}$ doped materials or transition metal ion (e.g. $Cr^{4+}$) doped materials. Examples of nonlinear optical crystals include $KTiOPO_4$ (KTP), lithium niobate ($LiNbO_3$), potassium niobate ($KNbO_3$), lithium triborate ($LiB_3O_5$) which is commonly known as LBO, and beta barium borate ($\beta$-$BaB_2O_4$) which is commonly known as $\beta$-BBO. Another example of a laser element is a composite of materials such as a solid-state gain medium and a nonlinear crystal that together form a composite laser cavity, such as that described in U.S. Pat. No. 5,574,740, assigned to the same assignee as herein, which is hereby incorporated by reference herein. Still another example of a laser element is a saturable absorber that is utilized for a passively Q-switched lasers.

Some materials suitable for the OTHs 110 and 120 include sapphire ($Al_2O_3$), diamond, and undoped (white) YAG, among other materials. The material selected for the OTHs should have a high optical transparency at the wavelength(s) where high transmission is desirable. Furthermore, in many embodiments the OTH material has a higher thermal conductivity than the laser element; for example, sapphire would be appropriate for $Nd:YVO_4$ because the thermal conductivity of $Nd:YVO_4$ is about 5.2 W/m-° C. and the thermal conductivity of sapphire is about 40 W/m-° C. However, in other embodiments the OTH may comprise an undoped gain medium, which has the same thermal conductivity as the gain medium. In some embodiments, it may be useful to approximately match the coefficients of thermal expansion of the OTHs and the gain medium, in order to maintain a good thermal contact between the two materials. Another design issue relates to manufacturing requirements: sapphire is very hard and therefore difficult to grind and polish, while white YAG is much easier. Therefore, sapphire is suitable for flat surfaces, while white YAG is suitable for non-flat surfaces.

The laser element 100 has a first smooth flat surface 105 formed on a first side and a second smooth flat surface 107 formed on a second, opposite side. The first and second flat surfaces 105 and 107 have an opposing, substantially parallel relationship so that together, the first and second flat surfaces 105 and 107 form an etalon. Preferably, the two flat surfaces of the etalon are parallel to less than 10 arc-seconds and have a highly polished surface that exhibits a surface roughness of better than fifteen Å rms and preferably five Å rms.

Any suitable bonding technique, such as optical contact, is used to bond the laser element 100, the first OTH 110, and the second OTH 120. Because it is usually unnecessary to optically coat the two surfaces, they can be bonded together by conventional optical contact methods; however, glue, epoxy, or diffusion bonding may be used in alternative embodiments to bond the OTH to the laser element. In some embodiments, optically-contacted surfaces are diffusion bonded by application of heat and/or pressure in order to provide a stronger bond.

The first OTH 110 includes a first side 115 and a second side 117. The second side has a flat, smooth surface designed to fit closely with the first surface 105 of the laser element. In some embodiments, the first and second sides have a flatness sufficient to promote bonding by optical contact techniques. In some embodiments, the opposing sides 115 and 117 of the OTH are formed to etalon tolerances (i.e. parallel to less than 10 arc-seconds) and have highly polished surfaces. However, in other embodiments, the first side 115 of the OTH may comprise a non-flat shape, for example the first side may comprise a curved shape (like a lens) or a flat surface angled with respect to the laser axis.

In some embodiments, such as described later with reference to FIG. 3, it may be useful to include only the first OTH for reasons such as cost, or to accommodate a non-flat surface on the second surface of the laser element. However, more effective cooling can be accomplished in many embodiments by using the second OTH 120 in addition to the first OTH 110. The second OTH 120 may be identical in construction to the first OTH, and is bonded to the laser element in like manner. Particularly, the second OTH 120 includes a first side 125 and a second side 127. The first side 125 of the OTH is designed to closely contact the second surface 107 of the laser element and preferably, the first side 125 of the second OTH has a flatness sufficient to promote bonding with the second surface 107 of the laser element by optical contact techniques. In one embodiment, the second OTH comprises a material having approximately the same index of refraction as the first OTH; and preferably, the second OTH comprises the same type of material as the first OTH. In some embodiments the opposing sides 125 and 127 of the second OTH are formed to etalon tolerances (i.e. parallel to less than 10 arc-seconds) and have highly polished surfaces.

In alternative embodiments, the OTHs on the side distal from the laser element, (e.g. in FIG. 1, the first side 115 of the first OTH and/or the second side 127 of the second OTH) may not be flat. Instead, one or more of the OTHs may have an angled shape or a curved shape, which may be convex or concave. For example, a curved shape can be used to shape the lasing mode within the laser cavity, and an angled shape can be used to direct converted radiation from the laser cavity.

In so me alternative embodiments it may be useful or necessary to coat one of the two surfaces to be bonded together, for example a coating at the interface between the two surfaces may be useful in order to reflect optical radiation at a predetermined wavelength. In such embodiments it is usually preferable to coat the OTH rather than the laser element due to the higher cost and more stringent handling requirements generally associated with coating a laser element.

During operation of a laser, heat will be produced within the laser element. The OTH conducts heat away from the laser element and into a heat sink where it is dissipated. In the embodiment of FIG. 1, a heat sink 130 that includes a metallic section 132 is thermally coupled to the first OTH 110 by any available means, such as thermally conductive epoxy, solder or other means. In order to effectively draw heat from the OTH, the metallic section 132 has a high thermal conductivity. Copper or aluminum are suitable materials; however, other materials, metallic and non-metallic, may be used as long as they provide sufficient thermal conductivity. Generally, the heat sink is situated as closely to the beam path as possible without blocking it or introducing substantial diffraction losses. In one embodiment, a circular aperture is provided in the metallic section of each heat sink in order to allow passage of optical radiation; specifically an aperture 135 is provided in the metallic section 132, with an appropriate shape and a sufficient size to accommodate the laser radiation passing therethrough. In order to avoid diffraction losses, the diameter of the aperture should be at least two to three times the widest diameter of the optical radiation passing therethrough, except in the case of a pump beam focused into a solid-state gain medium, in which case the aperture need only be slightly larger than the widest diameter of the pump beam. However, for thermal reasons related to cooling the OTH, the aperture 135 should be as small as possible. In any particular embodiment, thermal considerations and optical losses can be balanced in order to design an aperture with the appropriate shape and size. Furthermore, although the aperture is shown as circular, it could have other shapes. In alternative embodiments, the metallic heat sink could be coupled anywhere on the exposed surfaces of the OTH, for example on the edge of the OTH rather than on its face.

Furthermore, other types of heat sinks rather than the metallic heat sink can be used. For example, in some alternative embodiments, the heat sink could comprise forced air and therefore the metallic heat sink and/or the heat exchanger could be eliminated. In such embodiments, a fan could be utilized.

In some embodiments, sufficient heat will be dissipated solely by air contact with the OTH and the metallic heat sink; however other embodiments will need more aggressive heat dissipation. In one of these embodiments, a heat exchanger may be coupled to the metallic heat sink to dissipate heat therefrom. Specifically, a heat exchanger 150 is thermally coupled to the metallic section 132. The heat exchanger comprises any suitable device such as a fan and/or heat fins formed in the metallic sections or as a separate component, but for more effective cooling each heat exchanger comprises a thermoelectric cooler ("TEC") or uses a cooling fluid such as water. In many embodiments, each TEC has sufficient cooling power to maintain its respective metallic heat sink at a substantially constant temperature throughout its volume.

Although a single heat sink is shown in FIG. 1, in other embodiments a second heat sink (not shown) may be thermally coupled to the second OTH. For example, a second heat sink like the heat sink 130 may be thermally coupled to the second OTH to increase the rate of heat transfer. However, if the heat transfer requirements of the laser element can still be met, one or both of the heat exchangers and/or the metallic heat sinks may be omitted Reference is now made to FIG. 2, which is a cross-sectional side view of a longitudinally-cooled laser assembly in which the first OTH 110 and the laser element 100 are bonded together at a first interface 210, and the second OTH 120 and the laser element 100 are bonded together at a second interface 220. The bonding at both interfaces is preferably by optical contact although other means, such as glue, epoxy, or diffusion bonding may be used.

The first side 115 of the first OTH has a coating 230 formed thereon, which may be reflective, anti-reflective, or a combination of reflective and anti-reflective in order to transmit or reflect optical radiation at a predetermined wavelength as appropriate for the intended application. Similarly, the second OTH 120 on its second side 125 has a coating 240 formed thereon, which may be reflective, anti-reflective, or a combination of the two in order to transmit or reflect optical radiation as appropriate for the intended application. The coatings 230 and 240 may comprise dielectric layers. Advantageously, coating one or both of the OTHs instead of the laser element is usually easier (and therefore less costly) from a manufacturing standpoint. Furthermore, coating one or both of the OTHs instead of the laser element reduces the risk of damage to the laser element which is typically more expensive and more fragile.

Figure 2:
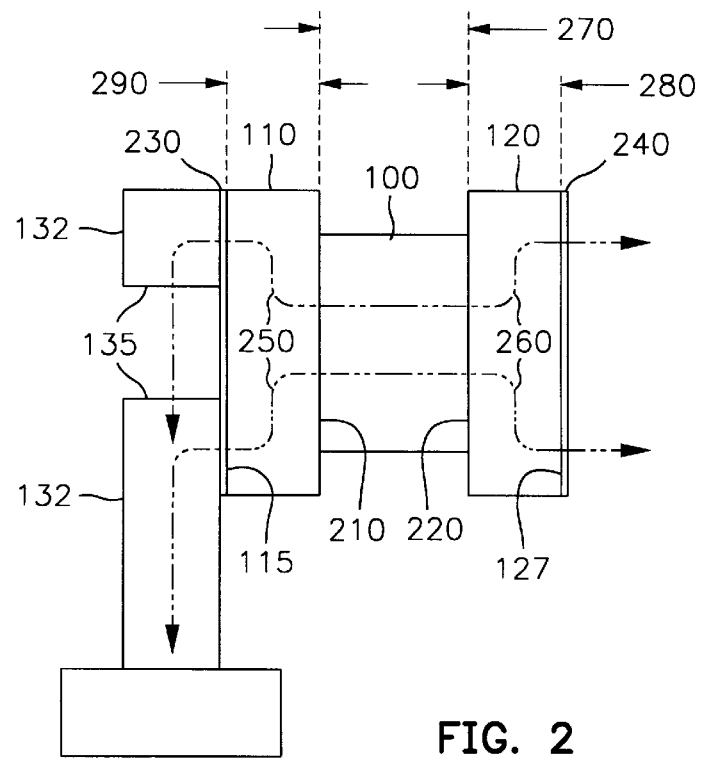
FIG. 2 is a cross-sectional side view of a double-sided longitudinally-cooled laser assembly shown in FIG. 1.
Figure 7:
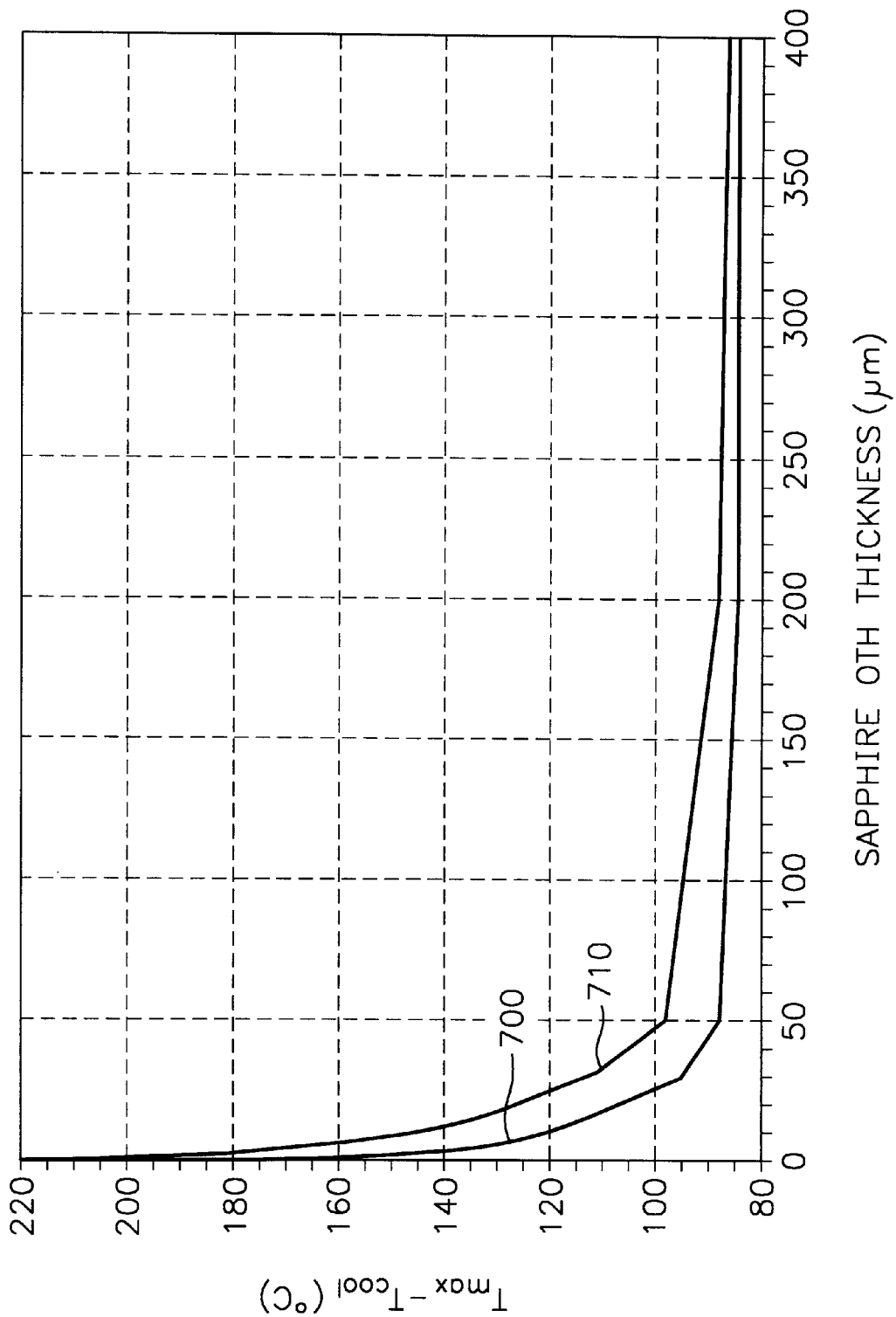
FIG. 7 is a graph depicting the results of calculations to determine the maximum temperature difference between the interior of the laser element and the heat sink as a function of OTH thickness.

In FIG. 2, heat flow during operation is illustrated by arrows 250 and 260. Specifically, heat flows longitudinally to the left as illustrated by arrows 250 and also to the right as illustrated by arrows 260. Particularly, the heat generated in the laser element 100 by, for example absorption of optical radiation, flows from the laser element, into the OTHs, and then out. The heat from the first OTH flows into the heat sink 132, and the heat from the second OTH flows into the air surrounding it. Each OTH and heat sink should be designed to maximize heat flow from the laser element. In one embodiment, the thickness of the OTH along the laser axis (which could be the optical axis of a laser cavity or simply the direction in which a beam is propagating) is chosen to minimize the thermal resistance (and associated temperature difference) between the laser material and the heat sink. An approximation for the thermal resistance of the OTH is $R_{th}=l/kA$ where l is the distance between the lasing spot and the metallic heat sink, k is the thermal conductivity, and A is the cross-sectional area in the plane perpendicular to the direction of heat flow. Determination of the proper OTH thickness for thermal considerations should balance several factors including lasing mode size, laser material thickness, and heat sink aperture size. If the OTH thickness is made too large, the thermal resistance increases with thickness. However, if the thickness is made too small, the cross-sectional area becomes small and the thermal resistance again increases. In one example for embodiments using sapphire as an OTH material, it has been found that a thickness in the range of 0.15 mm to 1.0 mm will provide satisfactory performance. The results of a finite element analysis in which thermal heat flow equations were used to show the variation in peak temperature ($T_{max}-T_{cool}$) as a function of OTH thickness for one exemplary embodiment are shown in FIG. 7, and described in connection therewith.

In addition to considering the thermal conductivity properties of an OTH material when determining the optimum thickness, the optical scattering properties at the lasing wavelength should also be considered. For example, in embodiments in which the OTH comprises optical quality sapphire or YAG, the optical scattering is sufficiently low at near-infrared and visible wavelengths that scattering losses can be neglected for OTH thicknesses less than 500 µm. Although CVD (Chemical Vapor Deposition) diamond has a higher thermal conductivity, unfortunately, to date, it also has significant optical scattering properties at near infrared and visible wavelengths, and it is expensive, which makes CVD diamond less desirable at those wavelengths than sapphire or white YAG.

Still referring to FIG. 2, first intracavity etalon 270 is defined between the first interface 210 and the second interface 220 by substantially flat, smooth, parallel surfaces. In embodiments in which the etalon 270 is balanced, the interfaces 210 and 220 have approximately equal Fresnel losses. In the preferred embodiment, the first and second OTHs comprise identical materials so that their indexes of refraction are equal and therefore their Fresnel losses are equal. In alternative embodiments, the first and second OTHs may comprise different materials having approximately equal indexes of refraction, which also provide approximately equal Fresnel losses. In still other alternative embodiments, the first and second OTHs may comprise different materials having different indexes of refraction, and one or both of the interfaces 210 and 220 could include a coating formed to balance the Fresnel losses (i.e., provide approximately equal Fresnel losses) at the two interfaces 210 and 220.

Under the condition that the Fresnel losses are approximately equal, the etalon 270 is balanced, and therefore resonant optical radiation can pass through both interfaces 210 and 220 in the laser element with substantially no loss. Preferably the bonding methods used are identical at both interfaces so that each interface is as identical to the other as possible.

In alternative embodiments, it may be useful to provide the second OTH 120 with an etalon structure having parallel, opposed surfaces. In such embodiments, a second etalon 280 is defined between the second interface 220 and the outer coating 240 on the second side of the second OTH. To reduce losses further, the second etalon 280 could be balanced (i.e., the outer coating 240 could be designed to balance the Fresnel loss at the second interface 220 at a predetermined wavelength). In alternative embodiments where the second etalon 280 is used in combination with the first etalon 270, an etalon is also defined between the first interface 210 and the outer coating 240, and optical radiation at predetermined wavelengths can pass substantially loss-free through the first interface 210, the second interface 220, and the outer coating 240.

In still other alternative embodiments, it may be useful to provide the first OTH 110 with an etalon structure, so that an etalon is defined between all surfaces of the assembly. In such embodiments, a third etalon 290 is defined between the outer coating 230 of the first OTH and the first interface 210. To reduce losses further, the third etalon 290 may be balanced (i.e., the coating 230 may be designed to balance the Fresnel loss at the first interface 210 at a predetermined wavelength or wavelengths). In alternative embodiments where the third etalon 290 is used in combination with the second etalon 280 and first etalon 270, etalons are defined between all surfaces of the assembly (e.g. between the first interface 210 and the outer surface 115, between the coating 230 and the first interface 220 and also between the two outer surfaces 115 and 127), and optical radiation at predetermined wavelengths can pass substantially loss-free through the entire assembly, including the outer coating 230, the first interface 210, the second interface 220, and the outer coating 240. In alternative embodiments the outer coating 230 of the first OTH may be highly reflective (e.g. to form one mirror of a laser cavity), and in these embodiments the third etalon 290 substantially reduces the loss at the first interface 210 at resonant wavelengths, as described previously.

In FIG. 2, the metallic section 132 of the heat sink 130 is thermally coupled to draw heat longitudinally from the OTH 110, and supply it to a heat exchanger 150 that is thermally coupled thereto.

Figure 3:
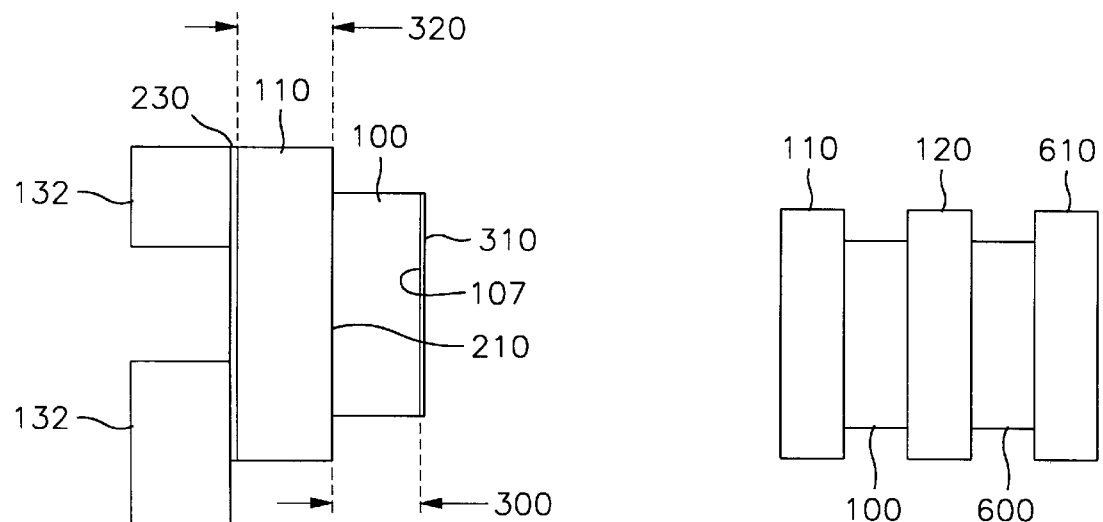
FIG. 3 is a cross-sectional side view of a single-sided longitudinally-cooled laser assembly including a laser element cooled longitudinally on one side by an OTH and a metallic heat sink.

Reference is now made to FIG. 3, which is a cross-sectional side view of an assembled single-sided laser element assembly in which the first OTH 110 and the laser element 100 are connected together at the first interface 210. In the single-sided configuration of FIG. 3, the laser element 100 has the structure of an etalon 300 defined between the first interface 210 and the second flat surface 107. Preferably, the etalon 300 is balanced, which means that the Fresnel loss at the interface 210 is approximately equal to the reflectivity at the surface 107. In order to make the reflectivity approximately equal, a coating 310 may be formed on the second surface 107 of the laser element to balance the Fresnel loss at the first interface 210. The coating 310 may, for example comprise a dielectric coating having a predetermined reflectivity at the wavelength of interest. However, in some embodiments the Fresnel loss may be low enough that, as discussed previously, the effective reflectivity ($R_{eff}$) according to Eq. 2 is still very small, and therefore the coating 310 may comprise an anti-reflective coating rather than a reflective coating.

A Fresnel loss is defined as the reflective loss that occurs at an interface between two materials having different indexes of refraction. At the first interface 210, an optical beam will suffer a Fresnel loss that is directly related to the difference between the index of refraction of the OTH 110 and the index of refraction of the laser element 100. The Fresnel loss ($R_{FRESNEL}$) at the first interface 210 for a beam at normal incidence can be approximated by the following equation:

$$R_{FRESNEL} \approx \left(\frac{n_2 - n_1}{n_1 + n_2}\right)^2 \qquad \text{Eq. 3}$$

wherein $n_1$ is the index of refraction of the OTH and $n_2$ is the index of refraction of the laser element. In general, it is more important to balance an etalon that is not parallel with one of the end mirrors of the laser.

In order to balance the etalon 300 using the coating 310, a thin film dielectric coating can be applied to the surface 107 to provide a reflectivity approximately equal to the Fresnel loss at the interface 210 at a predetermined wavelength. Because this reflectivity value approximates the Fresnel loss, a balanced etalon structure is formed between the first interface 210 and the coating 310, which further reduces losses.

Figure 8:
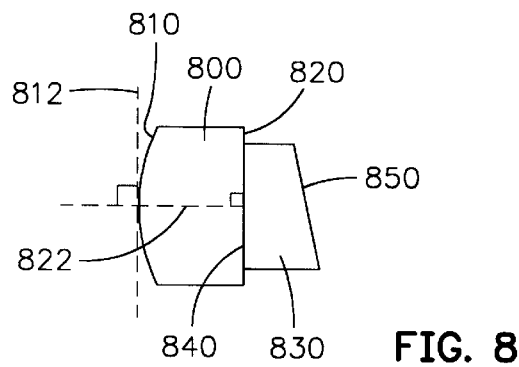
FIG. 8 is a cross-sectional view of an alternative embodiment of a laser assembly including an OTH that has an etalon structure between a curved surface and a flat surface, and a laser element coupled thereto having an angled reflector.

In alternative embodiments, it may be useful to form a second etalon 320 in the first OTH 120 between the first interface 210 and the outer coating 230 on the first side of the first OTH. In such embodiments, the outer coating 230 on the OTH would be designed to balance the Fresnel loss at the first interface 210. In some embodiments, both the second etalon 320 and the first etalon 300 may be implemented. In other embodiments the second etalon 320 may be implemented in the OTH while the first etalon 300 is not implemented in the laser element, and in these embodiments the distal surface 107 of the laser element may comprise an alternative shape such as a curved shape to provide focusing power or, as shown in FIG. 8, a flat angled surface to reflect predetermined wavelengths.

In some embodiments that include the second etalon 320, the outer coating 230 may be highly reflective, while the opposite side of the second etalon is highly transmissive. For example the outer coating 230 may comprise one of the end mirrors in a laser cavity. In these embodiments the second etalon 320 operates to substantially reduce the loss at the first interface 210 at resonant wavelengths, as described previously, even though the etalon 320 appears to be unbalanced.

The OTHs may be utilized in a variety of configurations. For example, in the embodiment shown in FIG. 3, an OTH could be used on only one side of the laser element. However, in the embodiment shown in FIGS. 1 and 2, a dual OTH arrangement provides OTHs on both sides. Many embodiments utilize the dual-OTH arrangement shown in FIGS. 1 and 2, for reasons in addition to the heat transfer requirements; particularly, the OTHs can be coated with necessary or appropriate optical coatings instead of the laser element, which can provide cost and manufacturing advantages.

Alternative embodiments can incorporate any combination of OTHs and other cooling features. In an embodiment in which a laser cavity has two laser elements (e.g. a gain medium and a nonlinear crystal) the first laser element may be cooled on one or both sides and the second laser element may be cooled on one or both sides, or not at all. Furthermore, additional devices for cooling the laser element may be employed: for example, conventional side-cooling apparatus may be employed in addition to one or two OTHs. In other embodiments, an OTH-cooled laser element may be situated externally from the cavity. The cooling provided by the OTHs is particularly useful at high powers, and can be very effective, particularly if the laser element is thin.

Alternative laser configurations that can utilize one or more OTHs for high power operation are disclosed in U.S. Pat. No. 5,761,227 entitled "Efficient Frequency Converted Laser", assigned to a common assignee, which is hereby incorporated by reference herein. Some examples of such embodiments are shown in FIGS. 8, 9, 10, and 11. That application discloses frequency-converted lasers such as intracavity-doubled solid-state lasers that use $Nd:YVO_4$ as a gain medium and a nonlinear crystal for frequency doubling.

Figure 4:
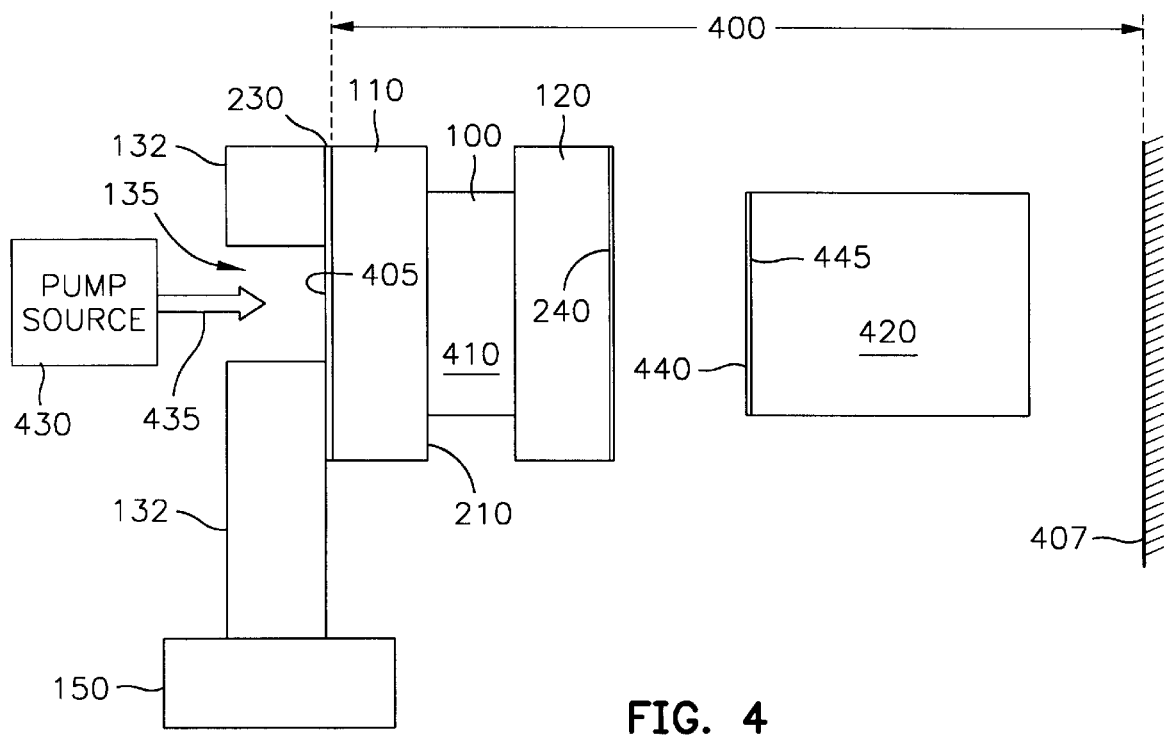
FIG. 4 is a cross-sectional side view of a frequency-converted laser including a laser gain medium cooled longitudinally by an OTH and a metallic heat sink, and a nonlinear material situated within the laser cavity.
Figure 5:
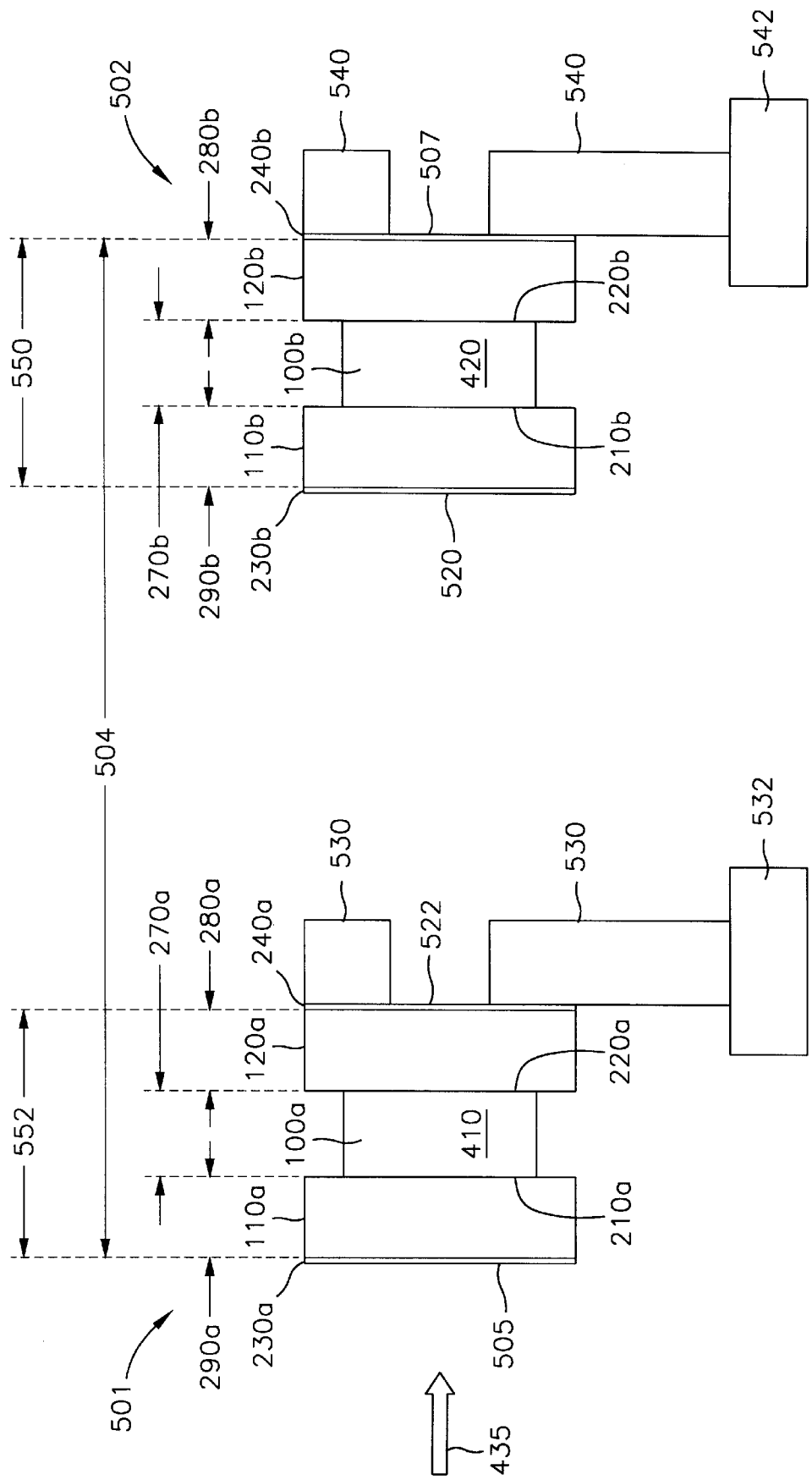
FIG. 5 is a cross-sectional side view of a frequency-converted laser including a laser gain medium cooled longitudinally on both sides by an OTH, and an intracavity nonlinear material also cooled by an OTH on both sides.

FIGS. 4 and 5 disclose exemplary embodiments of a solid-state laser in which intracavity laser elements are longitudinally cooled by an OTH. In the embodiments described with reference to FIGS. 4 and 5, heat can be an unwanted by-product of processes such as absorption of optical radiation from the pump source, absorption of laser emission, and frequency conversion. The OTH can be very effective at conducting away such heat.

FIG. 4 is a schematic diagram of a laser including a laser cavity 400 defined between a first mirror 405, sometimes termed an "pump coupler mirror" which is formed as part of the coating 230, and a second mirror 407, sometimes termed an "output reflector" or "output mirror". In FIG. 4, the laser element 100 comprises a solid-state gain medium 410 such as a $Nd^{3+}$ doped crystal or a $Cr^{4+}$ doped crystal situated within the laser cavity to provide a fundamental laser emission. One suitable gain medium 410 comprises $Nd:YVO_4$, however other suitable solid-state materials include rare earth-doped crystals such as $Nd^{3+}$ doped crystals: $Nd:GdVO_4$, $Nd:YAlO_3$, $Nd:YLiF_4$ and Nd:YAG, and transition metal-doped crystals such as $Cr^{3+}$ doped crystals: $Cr^{3+}:LiSrAlF_6$ (Cr:LiSAF) and $Cr^{3+}:LiCaAlF_6$ (Cr:LiCAF), and $Cr^{4+}$ doped crystals such as $Cr^{4+}:Mg_2SiO_4$ (Cr:forsterite) and $Cr^{4+}:Ca_2GeO_4$. Additionally, rare earth-doped glasses such as $Nd^{3+}$ or $Er^{3+}$-doped glasses or transition metal-doped glasses can be used. In one embodiment, the gain medium comprises an anisotropic crystal; that is, the crystal properties such as its index of refraction and/or its gain characteristics vary between two or three of its orthogonal crystal axes. Crystals exhibiting substantial anisotropic characteristics include $Nd:YVO_4$, Cr:LiSAF, and Cr:forsterite, for example. The anisotropic crystal is situated within the optical cavity so that it is birefringent in a plane perpendicular to the direction of the laser axis, with one of the crystal axes (either the ordinary axis or the extraordinary axis) defining the selected polarization.

A nonlinear material 420 is situated within the laser cavity to convert the fundamental laser emission to a converted frequency, which in the preferred embodiment is a doubled frequency. Examples of nonlinear optical crystals include KTP, $LiNbO_3$, $KNbO_3$, LBO, and β-BBO. In an alternative embodiment, the nonlinear material is a saturable absorber that is utilized for a passively Q-switched laser.

The gain medium 410 is optically pumped by a pump source 430 such as a laser diode. The optical pump radiation 435 from the laser diode, which diverges rapidly, is focused into the gain medium 410 through the first OTH. Alternatively, the optical radiation may be delivered by an optical fiber, or the laser diode may be situated closely enough to directly pump the gain medium without the need to focus the pump radiation (e.g. butt-coupled). The pump source 430 may comprise, for example a single laser diode, an array of laser diodes, or a laser diode bar.

The first mirror 405, formed by the first optical coating 230, is highly reflective at the fundamental laser emission, and highly transmissive (anti-reflective) at the wavelength of the pump radiation. In some embodiments, the second mirror 407 may be formed directly on the surface of the nonlinear material. Additionally, the coating 240 on the interior surface of the second OTH 120 and an interior coating 440 on an interior surface 445 of the nonlinear material is coated for high transmission (i.e. antireflection) and low absorption at the fundamental laser emission. In some other embodiments, the interior coating 240 may have a reflectivity approximately matching the reflectivity at the first interface 210 in order to balance the etalon formed by the gain medium 410.

In an alternative embodiment of the nonlinear material 420, the interior surface 445 may comprise an angled reflector for the converted beam of laser radiation such as disclosed in U.S. Pat. No. 5,761,227, entitled "Efficient Frequency Converted Laser", which is incorporated by reference herein. Examples of such embodiments are shown in FIGS. 8, 9, 10, and 11. Such an angled reflector operates to reflect converted radiation from the laser cavity at an angle with respect to the laser axis of the cavity.

Reference is now made to FIG. 5 which is an example of a laser that has two longitudinally-cooled laser assemblies, including a first assembly 501 and a second assembly 502. In one embodiment, a laser cavity 504 is defined between a first mirror 505 and a second mirror 507. The solid-state gain medium 410 is situated within the first assembly 501 in the laser cavity 504, and provides the fundamental laser emission. The nonlinear material 420 is situated in the second assembly 502 within the laser cavity, and is oriented to convert the fundamental laser emission to a converted frequency, which in one embodiment is a doubled frequency. The laser is pumped with optical radiation 435 from the pump source 430 (FIG. 4). In an alternative embodiment the nonlinear material 420 comprises a saturable absorber, which is used to implement a passively Q-switched laser.

In FIG. 5, a pair of OTHs 110b and 120b are used to cool the nonlinear material 420. In embodiments where the nonlinear material 420 is a nonlinear crystal, longitudinal cooling advantageously allows the temperature of the nonlinear crystal to be maintained closer to the optimum phase matching temperature across the mode volume of the laser beam, which is important due to the finite phase matching temperature acceptance of certain frequency conversion processes in nonlinear crystals. In addition, more uniform temperature distribution within the nonlinear crystal avoids inconsistent phase retardation in some nonlinear processes such as Type II phase matching, which could otherwise reduce both efficiency and amplitude stability. In summary, longitudinal cooling of nonlinear crystals using OTHs improves the efficiency of frequency conversion and also helps to maintain a stable output amplitude (i.e. avoids amplitude instabilities in the converted beam).

As illustrated in FIG. 5, both the first and second assemblies have metallic heat sinks on one side only, which cool the respective assemblies and additionally provide a way to mount the laser assembly to a box or chassis (not shown). In the first assembly 501, a first metallic heat sink 530 is thermally coupled to the second OTH 120a. The metallic heat sink 530 is thermally coupled to a heat exchanger 532, which is a thermoelectric cooler in one embodiment. In the second assembly 502, a second metallic heat sink 542 is thermally coupled to the second OTH 120b, and is also thermally coupled to a heat exchanger 542, which is a thermoelectric cooler in one embodiment. In alternative embodiments, the metallic heat sink and/or the heat exchanger in each assembly can be eliminated. For example, in an alternative embodiment in which the gain medium 410 has low heat transfer requirements, the metallic heat sink 530 can be eliminated so that the first OTH 110a is air-cooled. Still other alternative embodiments (not shown) comprise metallic heat sinks on both sides in order to improve heat exchange characteristics; however such a configuration must accommodate longitudinal thermal expansion of the laser assembly and therefore one metallic heat sink per assembly is preferred.

In FIG. 5, the metallic heat sink 530 is situated distal from the pump source 430, while FIG. 4 shows the metallic heat sink 132 situated proximate to the pump source 430. The two embodiments have different advantages. The embodiment shown in FIG. 4 is useful for highly absorbing and/or relatively thick gain media, where most of the optical pump energy is absorbed near the entry point of the pump beam (i.e. proximate to the first OTH 110). With such a design, the metallic heat sink 132 is situated on the entry side of the pump beam, which is closer to the area of high energy absorption, to thereby more effectively cool the region with the highest temperature. Such a configuration is useful for high power and/or relatively thick gain media. However, one drawback of situating the metallic heat sink 132 on the entry side of the pump beam relates to the small size of the aperture 135, which is typically designed just large enough to reduce diffraction losses while small enough to provide effective heat transfer, for example 750 microns. The small size of the aperture 135 requires precise alignment with the pump beam, which imposes stringent requirements on the optical system and the mechanical system that holds it. The embodiment of FIG. 5 eliminates this problem by situating the metallic heat sink on the side distal from the pump beam. This embodiment is useful for gain media that are not highly absorbing, or for embodiments in which the gain medium is thin enough that the single heat metallic sink can effectively cool it even though located distal from the entry point of the pump beam. For example, if the gain medium has a width of about 300 microns, and a significant portion of the pump energy is not absorbed in a single pass, then it can be useful to situate the metallic heat sink on the distal side, as in FIG. 5.

The double-sided OTH configuration shown in FIG. 5 is very useful to dissipate the heat generated by high intensities within a solid state laser; particularly, optical pumping at high intensities can generate a great deal of heat due to absorption of the optical pump radiation. Furthermore, the high intensity of the fundamental laser emission can create heat in intra-cavity elements such as a nonlinear crystal due to high circulating power levels. Also, the frequency converted radiation, although having a lower intensity than the fundamental emission, may be more highly absorbed and therefore can generate heat. Cooling the gain medium 410 effectively using this configuration increases the lasing efficiency and prevents damage, and allows higher power operation to be maintained. Cooling the nonlinear material 420 using this configuration ensures efficient, reliable frequency conversion.

In the first assembly 501, the solid-state gain medium 410 is situated between a first OTH 110a and a second OTH 120a. An etalon may be defined in each of the gain medium 410, the first OTH 110a and/or the second OTH 120a. In the preferred embodiment, a first etalon 270a is defined in the gain medium 410 between the OTHs: particularly, the first etalon 270a is defined between a first interface 210a and a second interface 220a. In one embodiment, the first and second OTHs both comprise the same material (e.g. sapphire), and therefore the etalon 270a is inherently balanced.

In some embodiments, the second OTH 120a has an etalon structure, so that a second etalon 280a is defined between the interior-facing coating 240a and the interface 220a with the gain medium. In those embodiments, the second etalon 280a may be balanced by designing an interior coating 240a with a reflectivity for the fundamental laser emission that matches the Fresnel loss at the second interface 220a. In other embodiments the interior coating 240a may be designed for antireflection. In still other embodiments, the first OTH 110a has an etalon structure, so that a third etalon 290a is defined between the coating 230a and the first interface 210a.

In any particular embodiment, the first, second, and third etalons may be employed in any combination, which allows the laser assembly to be designed to meet predetermined cost and performance criteria. For example, one embodiment may include only the first etalon, and another embodiment may include only the second and third etalons. Another embodiment may include only the third etalon. It should be clear that the advantages provided by the etalon structure reduce loss at each etalon surface of the assembly.

In the second assembly 502, the nonlinear material 420 is situated between the first OTH 110b and the second OTH 120b. As with the first assembly, an etalon may be defined in each of the nonlinear material 420, the first OTH 110b and/or the second OTH 120b. In the preferred embodiment, a first etalon structure defines an etalon 270b between the OTHs: particularly, the etalon 270b is defined between a first interface 210b and a second interface 220b. In one embodiment, both the first and second OTHs comprise sapphire or both comprise undoped YAG, and therefore the etalon 270b is balanced. In some embodiments, the first OTH has an etalon structure, so that a second etalon 290b is defined in the first OTH 110b between the interior-facing coating 230b and the interface 210b with the nonlinear material. In some embodiments, the second etalon 290*b* may be balanced by designing the interior coating 230*b* with a reflectivity for the fundamental laser emission that matches the Fresnel loss at the first interface 210*b*. In some embodiments the interior coating 230*b* may be designed for anti-reflection. In some embodiments, the second OTH 120*b* has an etalon structure, so that a third etalon 280*b* is defined between the outer coating 240*b* and the second interface 220*b*.

In the embodiment of FIG. 5 described above, the first mirror 505 is formed in the first optical coating 230*a* and the second mirror 507 is formed in the second optical coating 240*b*. Both the first and second mirrors include a coating that is highly reflective at the fundamental laser emission. In addition, the first optical coating 230*a* is transmissive (i.e. anti-reflective) at the pump wavelength, and the second optical coating 240*b* is transmissive (i.e. anti-reflective) at the converted wavelength. In the first assembly 501, the interior facing surface of the second OTH 120*a* includes a coating 240*a* having high transmission at the fundamental laser emission. Similarly, in the second assembly, the interior facing surface of the first OTH 110*b* also includes a coating 230*b* having high transmission at the fundamental laser emission. Additionally, the coating 230*b* on the interior-facing surface of the first OTH may be highly reflective at the converted wavelength.

In one exemplary embodiment of the second assembly, an interior surface 520 of the first OTH 110*b* may comprise an angled reflector for the converted beam of laser radiation such as disclosed in U.S. Pat. No. 5,761,227, entitled "Efficient Frequency Converted Laser", which has been incorporated by reference herein. Such an angled reflector operates to reflect converted radiation from the laser cavity at an angle with respect to the laser axis of the cavity. In another embodiment, an interior surface 522 of the second OTH 120*a* may comprise an angled reflector for the converted laser beam.

In addition to the embodiment discussed above in which the first and second assemblies are situated within the single laser cavity 504, FIG. 5 can also be used to illustrate an alternative embodiment in which the nonlinear crystal is situated in an external cavity. In this alternative embodiment, the second assembly 502 is not situated within the laser cavity, but defines an external cavity 550 between the coatings 230*b* and 240*b*, which is resonant with the fundamental laser emission. In this alternative embodiment, the first assembly 501 includes a laser cavity 552 defined between the coating 230*a* (which would operate as a first mirror) and the coating 240*a* (which would operate as a second (output) mirror), and therefore the first assembly is a laser that supplies a laser beam. In this alternative embodiment, the coatings in the second assembly are selected to couple the external cavity 550 with the laser cavity 552, for example the first coating 230*b* is partially reflective of the laser emission and the second coating 240*b* is highly reflective of the laser emission and transmissive of the converted frequency.

Figure 6:
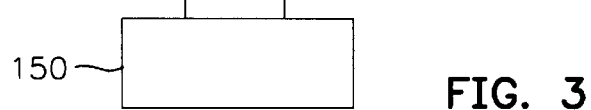
FIG. 6 is a cross-sectional side view of a laser assembly including two laser elements interposed between three OTHs.

FIG. 6 is a side view of an alternative embodiment of a laser element assembly in which a second laser element 600 and a third OTH 610 are added to the laser assembly that already includes the first OTH 110, the first laser element 100, and the second OTH 120. The third OTH is constructed like the first and second OTHs. The second laser element, like the first laser element, may comprise a gain medium or a nonlinear material. The second laser element may comprise the same material as the first laser element, or it may be different. For example, the first laser element may comprise a gain medium and the second laser element may comprise a nonlinear crystal. In addition to cooling the laser element, many OTHs can also provide structural strength because the OTHs are usually less susceptible to fracture than the crystals typically used for laser elements.

The configuration shown in FIG. 6 could be useful in various embodiments. For example, both the first and second laser elements may comprise a gain medium, thereby providing an effective gain length equal to the sum of the thicknesses of the two gain medium elements while retaining the benefits of longitudinal cooling for both.

In other embodiments, additional laser elements may be alternated in like manner with the OTH: for example, a third laser element (not shown) may be coupled to the third OTH, a fourth OTH (not shown) may be coupled to the third laser element, and so forth for as many laser elements and OTHs as desired. The additional laser elements in such an assembly need not comprise the same material. For example, one laser element may comprise a gain medium, and another may comprise a nonlinear material. Or, one laser element may comprise one type of gain medium, and another laser element may comprise another type of gain medium.

Many combinations of etalons may be used with the embodiment of FIG. 6 to provide a low loss laser element assembly, and it is particularly useful if alternating structures in the assembly comprise an etalon. For example the first and second laser elements may each comprise an etalon structure, or in another example, the first, second, and third OTHs may each comprise an etalon. In other embodiments, additional laser elements or OTHs may comprise an etalon. For example, all laser elements and all OTHs may comprise an etalon.

Reference is now made to FIG. 7 which is a graphical depiction that shows the calculated change of the temperature differential ($T_{max}-T_{cool}$) of the gain medium as a function of OTH thickness for an exemplary embodiment of a laser element assembly 501 (FIG. 5). The calculated values used to plot the graph are set forth in Table A. These values were calculated using a finite element analysis to solve thermal heat flow equations for an exemplary embodiment in which the laser element 410 (FIG. 5) is assumed to be 1 a.t. % Nd:YVO$_4$ with a thickness of 250 $\mu$m and a diameter of 3.0 mm. The laser element 410 is pumped by a laser diode that provides optical radiation 435 (FIG. 5) at 809 nm with a power of 10.0 watts and a pump spot diameter of 250 $\mu$m. The first and second OTHs 110*a* and 120*a* are assumed to be sapphire with equal thicknesses and a diameter of 4.0 mm. Both metallic heat sinks 132*a* and 142*a* are assumed to maintain a constant temperature of 20° C., and the second aperture 145 is assumed to have a diameter of 500 or 1000 $\mu$m.

The graph lines in FIG. 7 show how the temperature differential ($T_{max}-T_{cool}$) varies as a function of OTH thickness (in $\mu$m). Specifically, graph line 700 shows the calculated results if the diameter of the first aperture 135 is 500 $\mu$m, and graph line 710 shows the calculated results if the diameter of the first aperture 135 is 1000 $\mu$m. It should be noted that the analysis shown in the graph of FIG. 7 and the corresponding values in Table A have not been verified experimentally, and actual results for an implemented embodiment may vary.

TABLE A

| Substrate Thickness $\mu m$ | 500 $\mu m$ diameter hole in entrance heat sink $T_{max} - T_{cool}$ | 1000 $\mu m$ diameter hole in entrance heat sink $T_{max} - T_{cool}$ |
| --- | --- | --- |
| 0 | 176 | 216 |
| 3 | 147 | 178 |
| 5 | 136 | 166 |
| 8 | 127 | 155 |
| 10 | 122 | 147 |
| 15 | 112 | 133 |
| 30 | 96 | 111 |
| 50 | 88 | 98 |
| 100 | 86.5 | 94 |
| 150 | 85 | 90 |
| 200 | 84 | 87 |
| 400 | 84 | 85 |
| 1200 | 85 | 85 |
| 2500 | 86 | 86 |

FIG. 8 is a cross-section of an alternative embodiment of a laser assembly including an OTH 800 that has a curved first surface 810 and a flat second surface 820 opposite thereto. Together, the first and second surfaces of the OTH 800 define an etalon because a line 812 drawn tangent to the curved surface 810 is perpendicular to a line 822 drawn normal (i.e. perpendicular) from the second surface 820. A solid-state gain medium 830 has a first flat surface 840 that thermally contacts the OTH at the second surface 820. Opposite the first surface 840, the gain medium has a flat, angled surface 850. Such an angled surface can be useful to reflect the backward-propagating converted laser radiation as described in U.S. Pat. No. 5,761,227, entitled "Efficient Frequency Converted Laser", which is hereby incorporated by reference herein.

Figure 9:
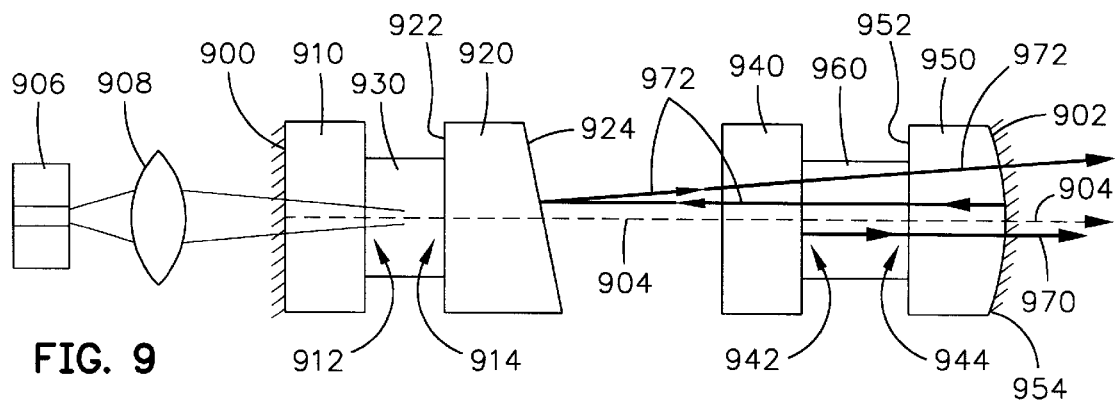
FIG. 9 is a cross-sectional view of one embodiment of a frequency-converted laser that includes OTHs and an angled reflector.
Figure 10:
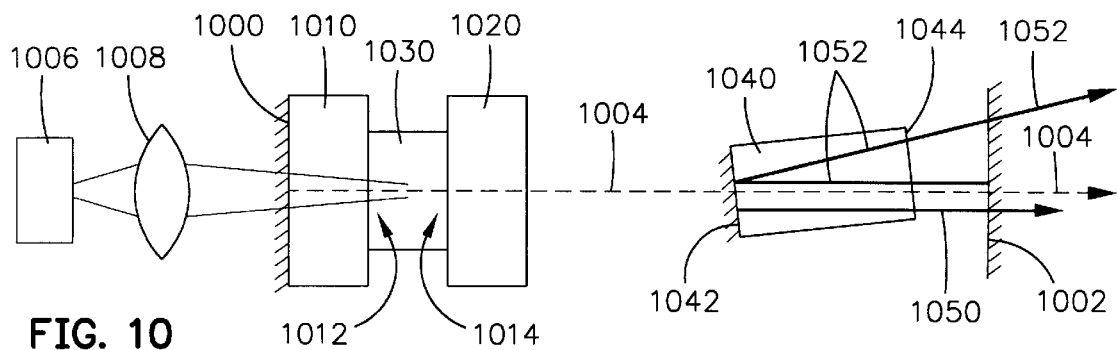
FIG. 10 is a cross-sectional view of another embodiment of a frequency-converted laser that includes OTHs and an angled reflector.
Figure 11:
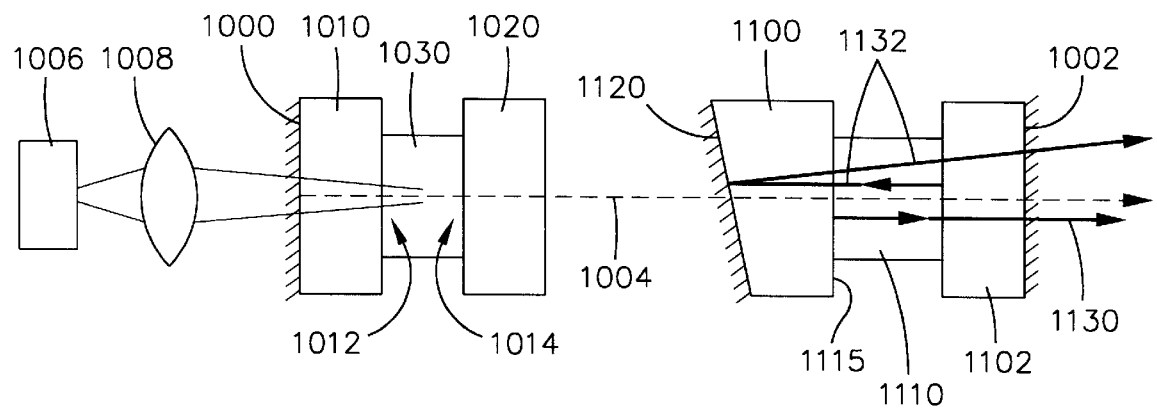
FIG. 11 is a cross-sectional view of still another embodiment of a frequency-converted laser that includes OTHs and an angled reflector.

FIGS. 9, 10, and 11 illustrate three examples of frequency-converted lasers that utilize OTHs and an angled reflector. In some embodiments the frequency is doubled; e.g., a fundamental emission at 1064 nm is frequency-doubled to 532 nm (green). However, in alternative embodiments other frequency-conversion processes, such as frequency-tripling, may be used.

FIG. 9 is a cross-sectional view of an embodiment of a frequency-converted laser having a laser cavity defined between a first mirror 900 and a second mirror 902, which together define a laser axis 904 for lasing operation. An optical pump source 906 such as a laser diode array supplies optical radiation in a longitudinal direction (i.e. along an axis parallel to the laser axis) that is focused by an optical element 908 into the gain medium within the laser cavity. The pump source may comprise a single stripe laser diode, a diode array, or a laser diode bar. Multiple laser diodes can be used to provide additional pump energy, such as for high energy uses. One highly suitable optical pumping source is at least one gallium aluminum arsenide (GaAlAs) laser diode that emits laser radiation at a wavelength matched with a suitable absorption band of the gain medium. Preferably, the laser diode's polarization is oriented with respect to the crystal axes of the laser medium for maximum absorption. In one embodiment, optical radiation from a laser diode array is coupled into a plurality of optical fibers which are collected into a bundle that supplies optical radiation to the gain medium. One suitable embodiment of a such an assembly is disclosed in Ser. No. 08/791,248, now U.S. Pat. No. 5,771,324, entitled Polarization-Preserving Fiber Optic Assembly, which is hereby incorporated by reference herein.

In FIG. 9, the frequency-converted laser utilizes a first OTH 910 and a second OTH 920 to cool a solid-state gain medium 930 situated therebetween, and also utilizes a third OTH 940 and a fourth OTH 950 to cool a nonlinear crystal 960 situated therebetween. The first OTH 910 comprises a flat-flat etalon structure, and the gain medium 930 also comprises a flat-flat etalon structure, thereby substantially reducing optical losses at intracavity interfaces 912 and 914. In one embodiment, the first OTH 910 comprises sapphire, which is preferred for flat-flat etalons, and the gain medium comprises Nd:YVO$_4$. The second OTH 920 has a flat surface 922 coupled to the adjacent flat surface of the gain medium, and an opposing side 924 having a flat surface that is angled with respect to the laser axis 904, which is useful to improve the efficiency of frequency conversion, as explained further below and in greater detail in U.S. Pat. No. 5,761,227. The flat angled surface 924 may be coated for high reflectivity at the wavelength of the converted beam, and also may be coated for antireflection at the wavelength of the lasing emission. In one embodiment, the second OTH 920 comprises white (undoped) YAG, which is easier to shape and polish than sapphire.

The third OTH 940 comprises a flat-flat etalon structure, and the nonlinear crystal 960 also comprises a flat-flat etalon structure, thereby substantially reducing optical losses at the intracavity interfaces 942 and 944. In one embodiment, the third OTH 940 comprises sapphire, and the nonlinear material comprises KTP or LiNbO$_3$. The fourth OTH 950 comprises a flat surface 952 coupled to the adjacent flat surface of the nonlinear crystal 960. The opposite side 954 of the fourth OTH, which defines the second mirror 902, also comprises a curved surface, which is useful to stabilize the laser cavity. In one embodiment, the fourth OTH 950 comprises white (undoped) YAG.

In operation, laser emission generated from the gain medium 930, which propagates back and forth within the laser cavity, is frequency-converted by the nonlinear crystal 960. Forward-propagating laser emission generates a first frequency-converted beam 970 propagating in the forward direction, and backward-propagating laser emission generates a second frequency converted beam 972 propagating in the backward direction. The backward propagating beam 972 is reflected at an angle with respect to the laser axis, and therefore it exits the cavity at an angle with respect to the forward propagating beam 970. This process creates dual converted beams. It is believed that this process improves efficiency and stability of frequency conversion by preventing intracavity interference between the reflected backward-propagating converted beam and the forward propagating converted beam.

FIG. 10 is a cross-sectional view of one embodiment of a frequency-converted laser having a laser cavity defined between a first mirror 1000 and a second mirror 1002, which together define a laser axis 1004 for lasing operation. An optical pump source 1006 such as a laser diode array or a laser diode array with a fiber optic bundle such as disclosed in U.S. Pat. No. 5,771,324 supplies optical radiation that is focused by an optical element 1008 into the gain medium within the laser cavity.

In FIG. 10, the frequency-converted laser utilizes a first OTH 1010 and a second OTH 1020 to cool a solid-state gain material 1030 situated therebetween. The first OTH 1010 comprises a flat-flat etalon structure, the gain material 1030 comprises a flat-flat etalon structure, and the second OTH 1020 also comprises a flat-etalon structure, thereby substantially reducing optical losses at intracavity interfaces 1012 and 1014. In one embodiment, the first and second OTHs 1010 and 1020 comprise sapphire, which is preferred for flat-flat etalons, and the gain medium comprises Nd:YVO$_4$.

In one embodiment, an angle-tuned nonlinear crystal 1040 such as β-BBO (beta barium borate) is situated within the laser cavity to frequency-convert the fundamental wavelength of the laser emission to a second wavelength. In the illustrated embodiment, no OTHs are utilized on the nonlinear crystal 1040, but in other embodiments one or more OTHs may be utilized. The nonlinear crystal 1040 has a first surface 1042 proximate to the gain medium, and also has a second surface 1044 opposite thereto. The first surface 1042 is coated for high reflection at the second wavelength corresponding to the converted radiation, and may also be anti-reflection coated at the fundamental wavelength.

The fundamental laser emission propagates back and forth within the laser cavity, and is frequency-converted by the nonlinear crystal 1040 into a first frequency-converted beam 1050 propagating in the forward direction, and a second frequency converted beam 1052 propagating in the backward direction. The backward propagating beam 1052 is reflected from the first surface 1042 at an angle with respect to the laser axis, and therefore it exits the laser cavity at an angle with respect to the forward propagating beam 1050, which improves the efficiency and stability of frequency conversion.

FIG. 11 is a cross-sectional view of an alternative embodiment of a frequency-converted laser that utilizes OTHs to cool a nonlinear crystal. The embodiment of FIG. 11, similar to the embodiment shown in FIG. 10, has a laser cavity between the first mirror 1000 and the second mirror 1002 that define the laser axis 1004. The first OTH 1010 and the second OTH 1020 are situated within the laser cavity, and the solid-state gain medium 1030 is situated therebetween. The optical pump source 1006, for example a laser diode array or a laser diode array with a fiber optic bundle such as disclosed in U.S. Pat. No. 5,771,324 supplies optical radiation to pump the gain medium 1030. In FIG. 11, a third OTH 1100 and a fourth OTH 1102 are thermally coupled on opposing sides of a nonlinear crystal 1110 in order to longitudinally draw heat from the nonlinear crystal, and thereby reduce or eliminate thermal gradients along the beam paths within the nonlinear crystal. The nonlinear crystal 1110 and the fourth OTH 1102 both have the form of a flat-flat etalon, and the second mirror 1002 is formed on the fourth OTH. The third OTH 1100 has a side 1115 adjacent to the nonlinear crystal that is flat. Opposite to the flat side 1115, an angled reflector 1120 is formed therein with a predetermined angle, having a coating that is highly reflective to the frequency-converted radiation, but which is highly transmissive of the laser emission. In one embodiment the third and fourth OTHs comprise sapphire, and the nonlinear crystal comprises KTP, LiNbO$_3$, β-BBO, or LBO.

In operation, laser emission generated by the gain medium 1030, which propagates back and forth within the optical cavity, is frequency-converted by the nonlinear crystal 1110 to generate a first frequency-converted beam 1130 propagating in the forward direction and a second frequency-converted beam 1132 propagating in the backward direction. The first frequency-converted beam 1130 exits the laser cavity through the second mirror 1002, and the second frequency-converted beam 1132 is reflected from the angled reflector and then exits the laser cavity at an angle with respect to the first frequency-converted beam. One advantage of this configuration is that it can be less costly to form the angled reflector and its required coating on the OTH rather than on the nonlinear crystal.

Heat sinks such as shown in FIGS. 1, 2, 3, 4, and 5, and described in connection therewith may be thermally coupled to improve heat transfer from any suitable surface of the laser embodiments shown in FIGS. 8, 9, 10, and 11. Typically, a heat sink is located on a flat surface of an OTH. For example, in FIG. 9, metallic heat sinks could be coupled to the flat surfaces on the first OTH 910 and the third OTH 940. In FIG. 10, metallic heat sinks could be coupled to the flat surface on the second OTH 1020. In FIG. 11, metallic heat sinks could be coupled to the flat surfaces on the second OTH 1020 and the fourth OTH 1102. A metallic heat sink also can provide a means for mounting the laser assembly to a box or chassis (not shown). However, heat sinks could also be coupled to the non-flat or angled surfaces.

Figure 12:
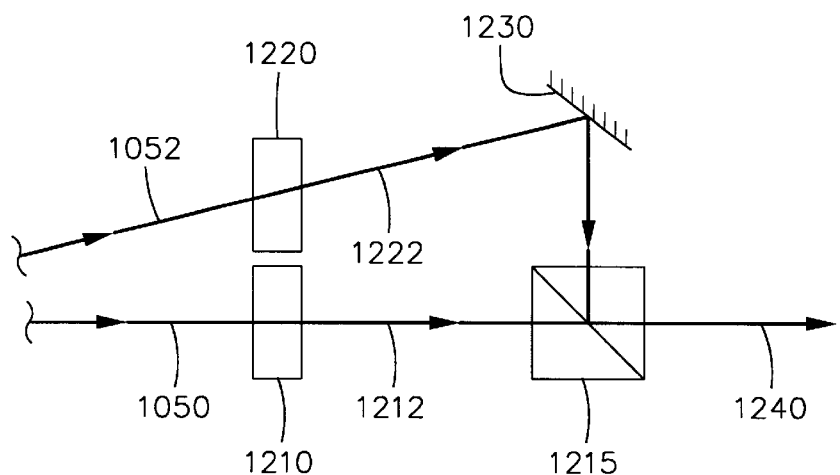
FIG. 12 is a schematic diagram of one example of a beam combiner that is useful to combine two frequency-converted beams into a single beam.

FIG. 12 is a schematic diagram of one example of a beam combiner for the two frequency-converted beams such as the beams 970, 1050, 1130 and 972, 1052, 1132 in FIGS. 9, 10, and 11, respectively, propagating at an angle with respect to each other; however, many different optical configurations may be used to combine the two beams. In FIG. 12, the two beams are "polarization combined". The forward-propagating converted beam 1050 is transmitted through a first λ/2 waveplate 1210, which rotates its polarization by 90° to create a first polarization-rotated beam 1212. The beam 1212 is then applied to a beamsplitter cube 1215 that is oriented to substantially transmit the polarization of the beam 1212. The other beam 1052 is transmitted through a second λ/2 waveplate 1212, which rotates its polarization by 90° to create a second polarization-rotated beam 1222. The polarization-rotated beam 1222 is then reflected off a mirror 1230 that directs it toward the beamsplitter cube 1215, which is oriented to reflect the second polarization-rotated beam 1222 from its internal interface. The optical elements including the mirror 1230 and the beamsplitter cube 1215 are situated so that both beams are made co-linear and overlapping, to provide a combined beam 1240.

In an alternative embodiment of the dual beam frequency-converted laser, the first and second converted beams are outputted from the laser cavity in ways other than those shown in FIGS. 9, 10, and 11. The first and/or second converted beams are outputted from the laser cavity by any suitable system, as long as they do not interfere with each other (i.e. they do not propagate in an overlapping manner) within the laser cavity. For example, rather than being outputted through the output reflector, the first converted beam is diverted from the laser cavity using an angled reflector situated between the second mirror and the non-linear material. In another alternative, the angled reflector is formed so that the second converted beam is outputted at a large angle such as 90° or more. In such an alternative, the reflected beam need not pass through the OTH and/or the nonlinear material. For example, in one embodiment a folded cavity configuration is utilized, and therefore the angled reflector may be rendered unnecessary. Alternative embodiments are discussed for example in Ser. No. 08/760, 702, now U.S. Pat. No. 5,761,227, which is incorporated by reference herein.

Alternative laser embodiments utilize an OTH-cooled nonlinear material such as shown in FIGS. 5, 9, 10, and 11 without the specific solid-state laser configuration shown. For example, in some embodiments an OTH-cooled nonlinear crystal is used with other solid state lasers that are not cooled by an OTH. In some embodiments, such as an alternative embodiment described with reference to FIG. 5, an OTH-cooled nonlinear material is not situated within the laser cavity, for example the OTH-cooled nonlinear crystal may be situated in an external resonant cavity, or even in a single-pass frequency conversion configuration. Furthermore, sources of laser emission other than a solid-state laser could be used with an OTH-cooled nonlinear crystal.

One advantage of using an OTH is that its outer surface (i.e. the surface distal from the interface with the laser element) can be coated with any necessary coatings instead of coating the laser element. For example, if the laser element uses an OTH on one side, the optical coating on that side of the laser element can be eliminated, and if the laser element uses an OTH on both sides, then the optical coatings on both sides can be eliminated. In these embodiments, elimination of the optical coating on the laser element has cost benefits because the optical coating can be applied to the less expensive OTH rather than the more expensive laser element, thus transferring the risk of damage to the OTH and allowing the laser element to be handled without the special handling requirements of coated materials. Furthermore, since the OTH materials are typically more robust (i.e. more durable) than the crystals sometimes used for laser elements, higher yields on coating runs for OTH material are possible with vacuum film deposition processes. Also, a more durable OTH material can stabilize and protect the more fragile solid-state gain medium from damage during manufacturing and subsequent use.

This invention is to be limited only by the following claims, which include all such embodiments and modifications when viewed in conjunction with the above specification and accompanying drawings.

What is claimed is:

1. An optically-pumped laser comprising:
   a laser cavity including a first mirror and a second mirror;
   a solid-state gain medium situated within said laser cavity to generate a laser emission;
   an optically transparent heat sink (OTH) thermally coupled to said gain medium, said OTH situated within said laser cavity and arranged so that said laser emission propagates through said OTH; and
   wherein at least one of said solid-state gain medium and said OTH has an etalon structure thereby improving laser efficiency.

2. The optically-pumped laser of claim 1 wherein said etalon structure includes two flat, opposing surfaces.

3. The optically-pumped laser of claim 1 wherein said etalon structure includes at least one curved surface.

4. The optically-pumped laser of claim 1 wherein said etalon structure is substantially balanced.

5. The optically-pumped laser of claim 1, further comprising a heat sink coupled to said OTH.

6. The optically-pumped laser of claim 1 wherein said first mirror is formed on said OTH.

7. The optically-pumped laser of claim 1, further comprising means for end-pumping said solid state gain medium with optical pump radiation to excite a laser emission within said laser cavity.

8. The optically-pumped laser of claim 7 wherein said optical pump radiation propagates through said OTH.

9. The optically-pumped laser of claim 7, further comprising a heat sink coupled to said OTH.

10. The optically-pumped laser of claim 1, further comprising a second OTH situated within said laser cavity, said second OTH thermally coupled to said gain medium at a second interface situated opposite to said first interface.

11. The optically-pumped laser of claim 10 wherein said second OTH comprises an etalon structure, thereby improving laser efficiency.

12. The optically-pumped laser of claim 10 wherein said gain medium comprises an etalon structure, and said first and second OTHs comprise substantially identical materials so that said etalon structure is balanced.

13. The optically-pumped laser of claim 1, further comprising a nonlinear material arranged within said laser cavity for frequency conversion.

14. The optically-pumped laser of claim 13, further comprising:
   a second OTH situated within said laser cavity, said second OTH thermally coupled to said nonlinear material at a second interface; and
   a third OTH situated within said laser cavity, said third OTH thermally coupled to said nonlinear material opposite said second interface;
   wherein at least one of said nonlinear material, said second OTH and said third OTH comprises an etalon structure.

15. The optically-pumped laser of claim 14 wherein said nonlinear material comprises an etalon structure having first and second surfaces that are approximately flat and parallel.

16. The optically-pumped laser of claim 13 wherein said laser cavity defines a laser axis, said nonlinear material is situated within said laser cavity to provide a first converted beam propagating in a first direction along the laser axis and a second converted beam propagating in a second, opposite direction along the laser axis, and further comprising:
   means for outputting said first and second converted beams from the lasing cavity such that said first converted beam exits along a first optical path and said second converted beam exits along a second optical path.

17. The optically-pumped laser of claim 16, further comprising a beam combiner situated outside said laser cavity for combining the first and second converted beams into a single optical path so that said first and second converted beams propagate substantially co-linearly outside said laser cavity.

18. The optically-pumped laser of claim 16 wherein said laser cavity has a linear configuration.

19. The optically-pumped laser of claim 16 wherein said outputting means includes an angled reflector situated between said gain medium and said nonlinear material for reflecting said second converted beam at a nonzero angle with respect to the laser axis.

20. The optically-pumped laser of claim 19 wherein said angled reflector is defined by said nonlinear material.

21. The optically-pumped laser of claim 19, further comprising a second OTH having a first surface and a second surface situated within said laser cavity, wherein said second OTH is thermally coupled to said nonlinear material at said first surface, and said second surface defines said angled reflector.

22. The optically-pumped laser of claim 19, further comprising a second OTH having a first surface and a second surface situated within said laser cavity, wherein said second OTH is thermally coupled to said gain medium at its first surface, and said second surface defines said angled reflector.

23. The optically-pumped laser of claim 19 wherein said angled reflector is defined by said gain medium.

24. A method of longitudinally cooling a laser element within a laser cavity, comprising:
   a) generating a laser emission within said laser cavity;
   b) propagating said laser emission through an optically transparent heat sink (OTH) that is situated within said laser cavity and is thermally coupled to said laser element;
   c) generating heat within said laser element, said heat flowing longitudinally from the element and into the OTH; and
   d) dissipating said heat from the OTH.

25. The method of claim 24, wherein said step d) includes air-cooling the OTH.

26. The method of claim 24, wherein said step d) includes conducting heat from the OTH through a metallic heat sink.

27. The method of claim 26, wherein said metallic heat sink is coupled to conduct said heat to a thermoelectric cooler, and said step d) includes dissipating said heat in said thermoelectric cooler.

28. The method of claim 24 wherein said laser element comprises a solid-state gain medium, further comprising the step of optically pumping said solid-state gain medium to excite said laser emission within said laser cavity.

29. The method of claim 28, further comprising the step of longitudinally pumping said solid-state gain medium with said optical pump source.

30. The method of claim 29, further comprising the step of optically pumping said solid state gain medium through said OTH.

31. The method of claim 24, further comprising the steps of:
providing a second intracavity OTH that is thermally coupled to the laser element;
generating heat within said laser element, and allowing said heat to flow longitudinally from the element and into the first and second OTHs; and
dissipating said heat from the first and second OTHs.

32. The method of claim 31 wherein said laser element comprises a nonlinear material, further comprising the step of frequency converting the laser emission in said nonlinear material.

33. The method of claim 24 wherein said laser cavity defines a laser axis, further comprising the steps of frequency converting the laser emission within the laser cavity to generate a first converted beam propagating in a first direction along the laser axis and a second converted beam propagating in a second, opposite direction along the laser axis;
outputting said first converted beam from said laser cavity along a first optical path; and
outputting said second converted beam from said laser cavity along a second optical path.

34. The method of claim 33, further comprising the step of combining said first and said second converted beams outside of said laser cavity, said combining step causing said first and said second converted beams to substantially overlap and propagate co-linearly outside of said laser cavity.

35. The method of claim 33, further comprising the step of:
outputting said first converted beam from the laser cavity through an output reflector that is substantially transmissive of the converted beam and substantially reflective of the laser emission, such that said first optical path is approximately collinear with said laser axis of the cavity.

36. The method of claim 35, further comprising the step of reflecting the second converted beam such that said second converted beam exits the laser cavity through said output reflector with a nonzero angle between the first and second converted beams.

37. The method of claim 33 wherein said outputting step includes reflecting said second converted beam from an angled reflector situated within said laser cavity such that said second converted beam exits said laser cavity at a predefined nonzero angle with respect to the laser axis, said angled reflector being transmissive of the laser emission and reflective of the converted beam.

38. The method of claim 37, wherein said angled reflector is situated between said gain medium and said nonlinear material, and said second converted beam is reflected at an angle that is large enough to avoid substantial overlap with said first converted beam within said laser cavity, thereby substantially avoiding intracavity interference between said first and second converted beams.

39. An optically-pumped laser comprising:
a laser cavity including a first mirror and a second mirror;
a solid-state gain medium situated within said laser cavity to generate a laser emission therein;
a first optically transparent heat sink (OTH) situated within said laser cavity and thermally coupled to said gain medium at a first interface, said first OTH arranged so that said laser emission propagates therethrough; and
a second OTH situated within said laser cavity and thermally coupled to said gain medium at a second interface opposite to said first interface, said second OTH arranged so that said laser emission propagates therethrough;
an optical pump source arranged to provide optical radiation through said first OTH to end-pump said gain medium to excite said laser emission within said laser cavity; and
wherein at least one of said solid-state gain medium, said first OTH, and said second OTH has an etalon structure thereby improving laser efficiency.

40. The optically-pumped laser of claim 39 wherein said optical pump source comprises a laser diode.

41. The optically-pumped laser of claim 39 wherein said first mirror is formed on said first OTH.

42. The optically-pumped laser of claim 39 wherein said etalon structure includes two flat, opposing surfaces.

43. The optically-pumped laser of claim 39 wherein said etalon structure includes at least one curved surface.

44. The optically-pumped laser of claim 39 wherein said gain medium comprises said etalon structure, and said first and second OTHs comprise substantially identical materials so that said etalon structure is balanced.

45. The optically-pumped laser of claim 39, further comprising a heat sink thermally coupled to said first OTH.

46. The optically-pumped laser of claim 39, further comprising a heat sink thermally coupled to said second OTH.

47. The optically-pumped laser of claim 39 wherein at least two of said gain medium, said first OTH, and said second OTH comprise an etalon structure.

48. The optically-pumped laser of claim 39 wherein said gain medium, said first OTH, and said second OTH comprise an etalon structure.

49. The optically-pumped laser of claim 39, further comprising a nonlinear material arranged within said laser cavity for frequency converting said laser emission.

50. The optically-pumped laser of claim 49, further comprising:
a third OTH situated within said laser cavity, said third OTH thermally coupled to said nonlinear material at a third interface; and
a fourth OTH situated within said laser cavity, said fourth OTH thermally coupled to said nonlinear material at opposite said third interface;
wherein at least one of said nonlinear material, said third OTH and said fourth OTH comprises an etalon structure.

51. The optically-pumped laser of claim 50 wherein at least two of said gain medium, said first OTH, and said second OTH comprise an etalon structure.

52. The optically-pumped laser of claim 50 wherein said gain medium, said first OTH, and said second OTH comprise an etalon structure.

53. The optically-pumped laser of claim 50 wherein said second mirror is formed on said fourth OTH.

54. The optically-pumped laser of claim 50 wherein said nonlinear material comprises an etalon structure in which said first and second surfaces are approximately flat and parallel.

55. The optically-pumped laser of claim 50 wherein said laser cavity defines a laser axis, said nonlinear material is situated within said laser cavity to provide a first converted beam propagating in a first direction along the laser axis and a second converted beam propagating in a second, opposite direction along the laser axis, further comprising:

means for outputting said first and second converted beams from the laser cavity such that said first converted beam exits along a first optical path and said second converted beam exits along a second optical path.

56. The optically-pumped laser of claim 55, further comprising a beam combiner situated outside said laser cavity for combining the first and second converted beams into a single optical path so that said first and second converted beams propagate substantially co-linearly outside said laser cavity.

57. The optically-pumped laser of claim 55 wherein said laser cavity has a linear configuration.

58. The optically-pumped laser of claim 55 wherein said outputting means includes an angled reflector situated between said gain medium and said nonlinear material for reflecting said second converted beam at a nonzero angle with respect to the laser axis.

59. The optically-pumped laser of claim 58 wherein said angled reflector is defined by said nonlinear material.

60. The optically-pumped laser of claim 58 wherein said angled reflector is defined by said gain medium.

61. The optically-pumped laser of claim 58, further comprising a third OTH having a first surface and a second surface within said laser cavity, said third OTH thermally coupled to said nonlinear material at said first surface, and wherein said second surface defines said angled reflector.

62. A frequency-converted laser comprising:

a source of laser emission;

a frequency conversion assembly including a nonlinear material arranged to frequency convert said laser emission, said nonlinear material having a first side proximate to said laser emission source and a second side distal from said laser emission source, a first optically transparent heat sink (OTH) having an interior side thermally coupled to said first side of the nonlinear material and an exterior side, and a second OTH having an interior side thermally coupled to said second side of the nonlinear material and an exterior side, wherein at least one of said nonlinear material, said first OTH, and said second OTH comprises an etalon structure; and an external resonant cavity within which said first OTH, said nonlinear material, and said second OTH are situated, said external resonant cavity being resonant to said laser emission.

63. The frequency-converted laser of claim 62 wherein said external resonant cavity is defined between said exterior surfaces of said first and second OTHs.

64. The frequency-converted laser of claim 63 wherein said exterior surfaces comprise coatings that are reflective of said laser emission.

65. The optically-pumped laser of claim 62 wherein at least two of said nonlinear material, said first OTH, and said second OTH comprise an etalon structure.

66. The optically-pumped laser of claim 62 wherein said nonlinear material comprises an etalon structure having first and second surfaces that are approximately flat and parallel.

67. The optically-pumped laser of claim 62 wherein said nonlinear material generates a first converted beam propagating in a first direction and a second converted beam propagating in a second, opposite direction, further comprising:

means for outputting said first and second converted beams from the external resonant cavity such that said first converted beam exits along a first optical path and said second converted beam exits along a second optical path.

* * * * *